US010802446B2

(12) United States Patent
Kojima et al.

(10) Patent No.: US 10,802,446 B2
(45) Date of Patent: Oct. 13, 2020

(54) TIME DISPLAY DEVICE, ELECTRONIC TIMEPIECE, TIME DISPLAY CONTROL METHOD AND STORAGE MEDIUM

(71) Applicant: CASIO COMPUTER CO., LTD., Tokyo (JP)

(72) Inventors: Tadashi Kojima, Musashimurayama (JP); Hirohisa Maruyama, Fuchu (JP); Kosuke Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 172 days.

(21) Appl. No.: 15/884,135

(22) Filed: Jan. 30, 2018

(65) Prior Publication Data

US 2018/0231940 A1 Aug. 16, 2018

(30) Foreign Application Priority Data

Feb. 13, 2017 (JP) ................................ 2017-023754

(51) Int. Cl.

| | |
|---|---|
| ***G06F 3/08*** | (2006.01) |
| ***G04F 8/00*** | (2006.01) |
| ***G04G 9/00*** | (2006.01) |
| ***G04B 19/00*** | (2006.01) |
| ***G04B 19/24*** | (2006.01) |
| ***G04F 3/08*** | (2006.01) |

(52) U.S. Cl.
CPC ............... *G04F 3/08* (2013.01); *G04B 19/00* (2013.01); *G04F 8/006* (2013.01); *G04G 9/00* (2013.01); *G04B 19/24* (2013.01)

(58) Field of Classification Search
CPC ....... G04F 3/08; G04F 8/006; G07C 1/22–28; A63B 71/0686
See application file for complete search history.

(56) References Cited

U.S. PATENT DOCUMENTS 5,523,985 A * 6/1996 Nixon ........................ G04F 1/00 368/107
5,894,457 A * 4/1999 Luth ....................... G04C 17/00 368/108
7,215,603 B2 * 5/2007 Koike ........................ G04F 8/00 368/223
7,773,464 B2 * 8/2010 Rogers .................... G04F 1/005 368/240
9,367,041 B2 * 6/2016 Peters .................... G04C 23/06
(Continued)

FOREIGN PATENT DOCUMENTS

JP 2007-256066 A 10/2007

*Primary Examiner* — Edwin A. Leon
*Assistant Examiner* — Jason M Collins
(74) *Attorney, Agent, or Firm* — Fitch, Even, Tabin & Flannery LLP

(57) ABSTRACT

A time display device, including: an indication display unit which displays a content according to an indicating operation, and a processor, wherein in a case where a remaining time with respect to a reference set time of an elapsed time from a measuring start timing is greater than a predetermined reference remaining time, the processor makes the indication display unit display a ratio of the remaining time with respect to the reference set time, and in a case where the remaining time is equal to or less than the predetermined reference remaining time, the processor makes the indication display unit display the remaining time.

23 Claims, 9 Drawing Sheets

(56) References Cited

U.S. PATENT DOCUMENTS

| | | | | |
|---|---|---|---|---|
| 2007/0016091 | A1* | 1/2007 | Butt | G04G 21/025 600/519 |
| 2011/0003665 | A1* | 1/2011 | Burton | G04F 10/00 482/9 |
| 2016/0124392 | A1* | 5/2016 | Genoud | G04F 7/065 368/102 |

* cited by examiner

TIME DISPLAY DEVICE, ELECTRONIC TIMEPIECE, TIME DISPLAY CONTROL METHOD AND STORAGE MEDIUM

CROSS-REFERENCE TO RELATED APPLICATION

This application is based upon and claims the benefit of priority from the prior Japanese Patent Application No. 2017-023754, filed on Feb. 13, 2017, the entire contents of which are incorporated herein by reference.

BACKGROUND OF THE INVENTION

1. Field of the Invention

The present invention relates to a time display device, an electronic timepiece, a time display control method and a storage medium.

2. Description of Related Art

For example, Japanese Patent Application Laid Open Publication No. 2007-256066 which is a Japanese patent document discloses analog type electronic timepieces, timers, chronographs (stopwatches) and the like which measure a date and time and an elapsed time and which display the date and time and the elapsed time by movement of a hand and a rotating plate. Further, some chronographs can display intermediate times (split times and lap times) and the like.

In a chronograph, a measured time is often measured while being compared to a reference value such as an aimed value. Further, in a chronograph and in a timer, a counted value is not just used as the final value and it may also be used as a reference for intermediate pace distribution.

However, with respect to such reference value and a set value of a timer, if a measured time and a remaining time is merely displayed, a user cannot easily be aware of the time measurement status with respect to a reference value.

SUMMARY OF THE INVENTION

There are disclosed a time display device, an electronic timepiece, a time display control method and a storage medium.

According to a preferred embodiment of the present invention, there is provided a time display device, including: an indication display unit which displays a content according to an indicating operation, and a processor, wherein in a case where a remaining time with respect to a reference set time of an elapsed time from a measuring start timing is greater than a predetermined reference remaining time, the processor makes the indication display unit display a ratio of the remaining time with respect to the reference set time, and in a case where the remaining time is equal to or less than the predetermined reference remaining time, the processor makes the indication display unit display the remaining time.

BRIEF DESCRIPTION OF THE DRAWINGS

The above and other objects, advantages and features of the present invention will become more fully understood from the detailed description given hereinafter and the appended drawings which are given byway of illustration only, and thus are not intended as a definition of the limits of the present invention, and wherein.

DETAILED DESCRIPTION OF THE PREFERRED EMBODIMENT

Hereinafter, an embodiment will be described on the basis of the drawings.

Figure 1:
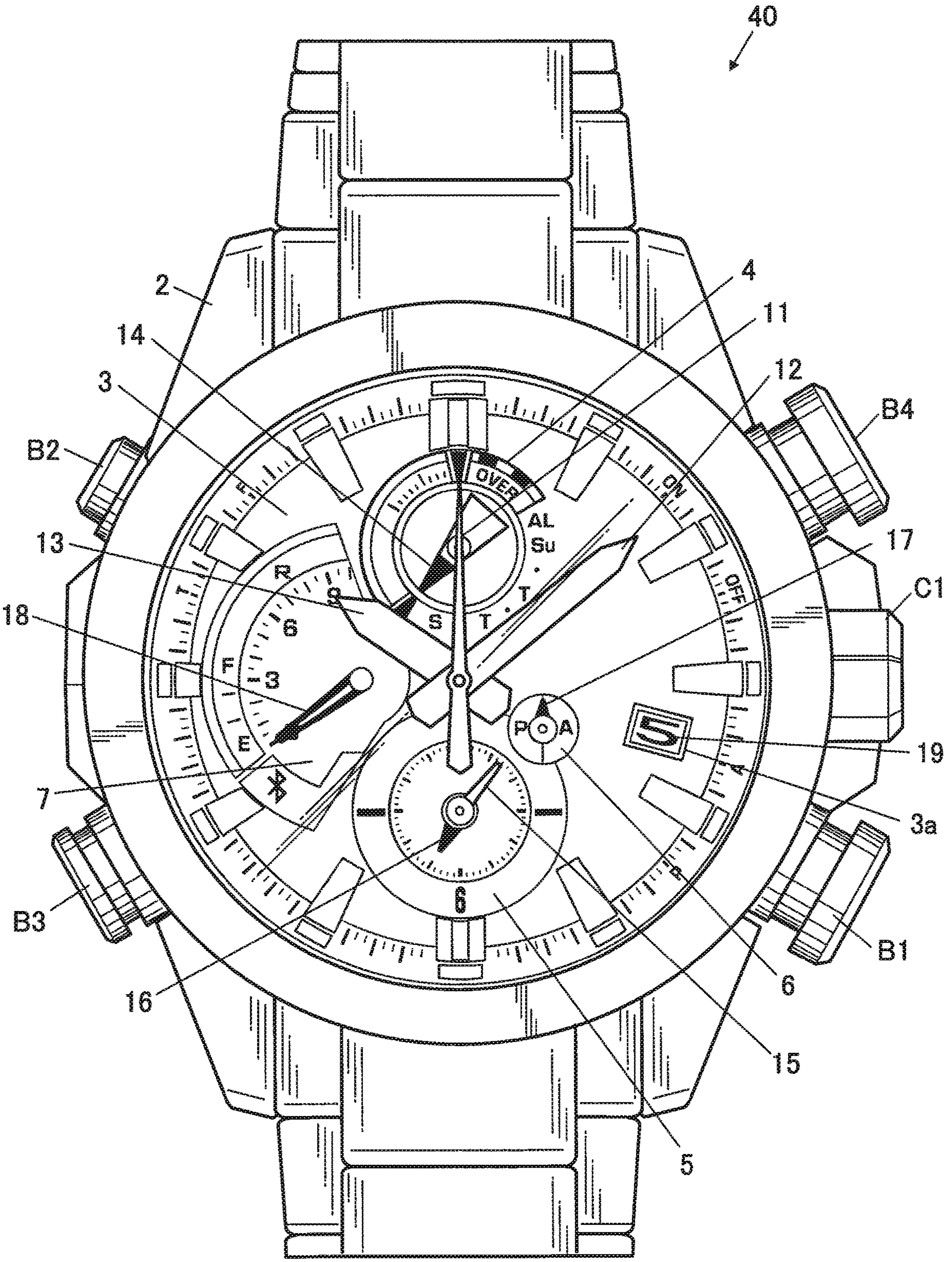
FIG. 1 is a front view of an electronic timepiece of an embodiment of the present invention.

FIG. 1 is a front view of the electronic timepiece 40 of the embodiment.

Figure 2:
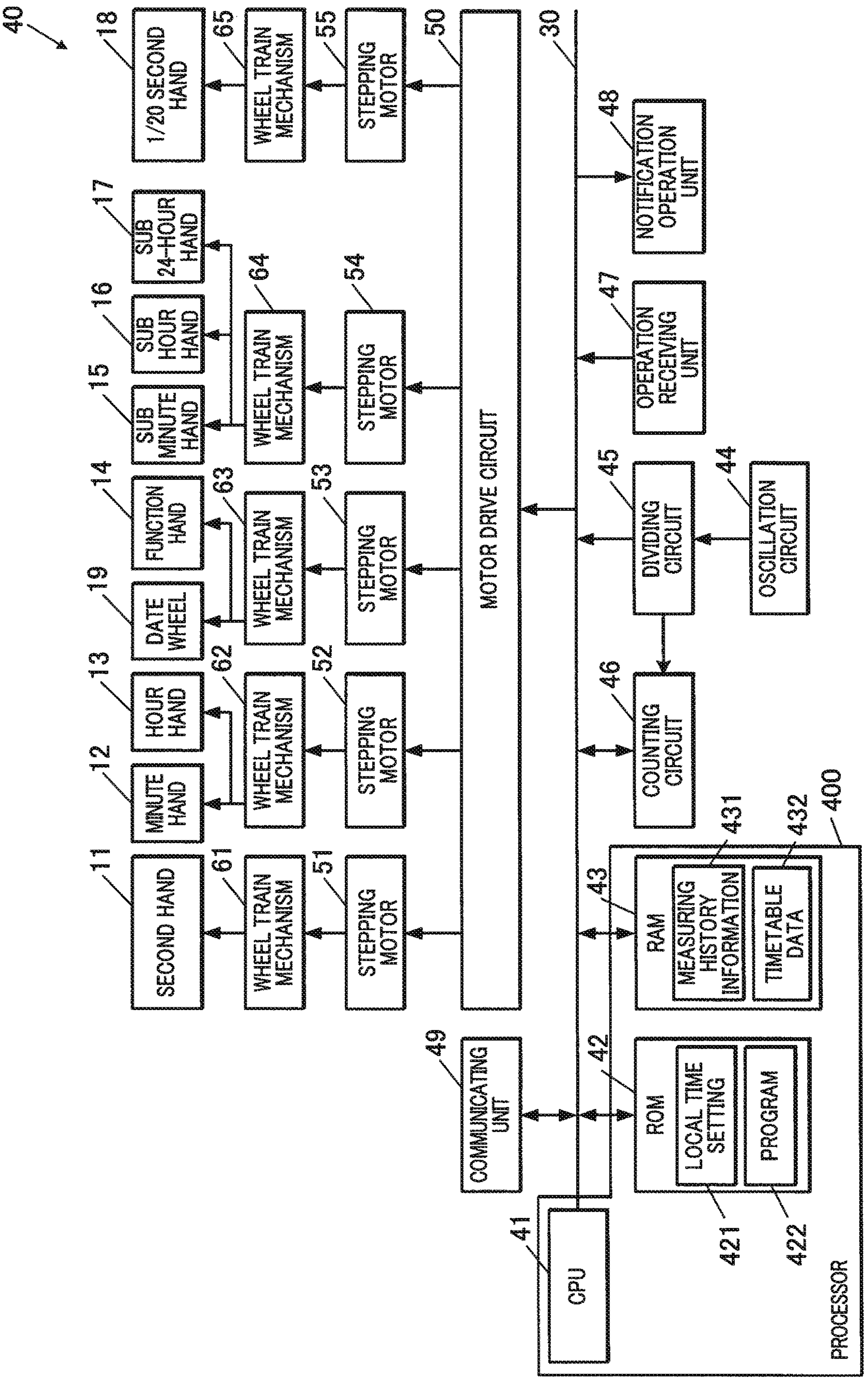
FIG. 2 is a block diagram illustrating a functional configuration of the electronic timepiece.

Further, FIG. 2 is a block diagram showing a functional configuration of the electronic timepiece 40.

As shown in FIG. 1, the electronic timepiece 40 (time display device, computer) is to be worn on an arm of a user like a wrist watch, and the electronic timepiece 40 includes a frame 2, a dial 3 which is disposed inside the frame 2, a second hand 11, a minute hand 12, an hour hand 13, a function hand 14, a sub minute hand 15, a sub hour hand 16, a sub 24-hour hand 17 and a 1/20 second hand 18 which are disposed on the display surface (upper surface side) of the dial 3, a date wheel 19 which is disposed on the side opposite to the display surface (in the lower section) of the dial 3, and push button switches B1 to B4 and a crown C1 which are disposed on the side of the frame 2. Hereinafter, a part of or all of the second hand 11, the minute hand 12, the hour hand 13, the function hand 14, the sub minute hand 15, the sub hour hand 16, the sub 24-hour hand 17, the 1/20 second hand 18 and the date wheel 19 will be described as the hands 11 to 19 all together.

The dial 3 and the hands 11 to 18 are covered with a transparent wind-proof glass from above (not shown). Further, on the under surface of the date wheel 19 and inside the frame 2 (on the side of the date wheel 19 which is opposite to the side that faces the dial 3), individual configurations and a power unit according to the driving control of the electronic timepiece 40 are disposed and they are covered with a case back.

The dial 3 is provided with scales and signs for carrying out display relating to time point and other various functions. Further, an opening 3$a$ is formed in the 3:30 direction and the date signs provided on the upper surface of the date wheel 19 can be selectively exposed therethrough.

Each of the hands 11 to 19 is a rotating indication unit which rotates to carry out an indication operation of indicating a display content which is predetermined according to the positional relationship with the dial 3 (signs and scales). The contents according to the directions indicated by the hands 11 to 18 and the rotation angle of the date wheel 19 (the sign exposed through the opening 3*a*) are displayed.

Each of the second hand 11, the minute hand 12 and the hour hand 13 is disposed so as to rotate in a plane which is parallel to the dial 3 with the approximate center of the dial 3 being the rotation axis. Scales and signs for displaying a date and time are disposed along the edge of the upper surface of the dial 3. Further, the dial 3 is provided with small windows 4, 5, 6 and 7. The date wheel 19 is a disk member (including a ring shape where a hole is formed in the center) which is disposed on the under surface of the dial 3 in parallel with the dial 3 so as to rotate. The date signs "1" to "31" indicating the dates are lined on a circle line in the upper surface in order having predetermined intervals therebetween. By the date wheel 19 being rotated, one of the date signs is selectively exposed through the opening 3*a*. In such way, the date information corresponding to the time point indicated by the hands 11 to 14 is displayed.

The second hand 11 rotates by a predetermined angle according to the stepping operation of the stepping motor 51 which is transmitted via the wheel train mechanism 61 which is formed of a plurality of gear trains. The second hand 11 is used to display the time point and can also be used to display the on/off switching setting of the alarm notification operation, to display whether the date and time that is indicated by the minute hand 12 and the hour hand 13 is in the morning or in the afternoon, to set the time zone in the case of local time setting, and the like.

Each of the minute hand 12 and the hour hand 13 rotates by a predetermined angle according to the stepping operation of the stepping motor 52 which is transmitted via the wheel train mechanism 62. The rotating angle per 1 step of the hour hand 13 equals to $1/12$ of the the rotating angle of the minute hand 12, and every time the minute hand 12 rotates 360 degrees (one circle) in 60 minutes, the hour hand 13 rotates 30 degrees which corresponds to one hour.

The function hand 14 is disposed so as to rotate inside the small window 4. The function hand 14 is a hand for carrying out various types of displaying relating to days (of week) and other functions. Further, when the stopwatch function or the timer function is being executed, the function hand 14 is used to display the time measurement status or the remaining time with respect to the set time. The function hand 14 rotates by a predetermined angle according to the stepping operation of the stepping motor 53 via the wheel train mechanism 63.

The date wheel 19 rotates with the function hand 14, and displays the date by changing the date sign which is to be exposed through the opening 3*a* by one day. The function hand 14 does not move more than one circle in a regular display operation, and the date sign which is displayed by the date wheel 19 hardly moves with the changing in the indication position of the function hand 14. On the other hand, when changing the date sign which is to be exposed through the opening 3*a*, the function hand 14 is moved for a plurality of circles which is predetermined.

The sub minute hand 15 and the sub hour hand 16 are disposed so as to rotate inside the small window 5. Further, the sub 24-hour hand 17 is disposed so as to rotate inside the small window 6. The sub minute hand 15, the sub hour hand 16 and the sub 24-hour hand 17 are for simultaneously displaying the local time (world clock) that is different from the time point indicated by the above described hands 11 to 14. Further, the hands 15 to 17 are used to indicate a measured time and a remaining time when the stopwatch function and the timer function are being executed.

Each of the sub minute hand 15, the sub hour hand 16 and the sub 24-hour hand 17 rotates by a predetermined angle according to the stepping operation of the stepping motor 54 which is transmitted via the wheel train mechanism 64. The rotating angle per 1 step of the sub hour hand 16 is $1/12$ of the rotating angle of the sub minute hand 15. Further, the rotating angle per 1 step of the sub 24-hour hand 17 is $1/2$ of the rotating angle of the sub hour hand 16.

The $1/20$ second hand 18 is the hand which is used for displaying $1/20$ seconds in the stopwatch function and the like. The $1/20$ second hand 18 is driven to rotate independently by the stepping motor 55 via the wheel train mechanism 65. Here, it is sufficient that the $1/20$ secondhand 18 rotate only within the range of 120 degrees between the 8:00 direction and the 12:00 direction in the small window 7, and it is sufficient that the number of rotating steps thereof is 20 steps or more. Further, the $1/20$ second hand 18 can be used for displaying the communication connection status with outside via the communicating unit 49, for displaying the voltage supply status from the power supplying unit (not shown), that is, the battery charge remaining, and the like.

The indication display unit of the electronic timepiece according to the embodiment includes the dial 3 and the hands 11 to 19.

The push button switches B1 to B4 and the crown C1 form the configuration for receiving an input operation from outside, the configuration being included in the operation receiving unit 47. The push button switches B1 to B4 receive push down operations from outside. The crown C1 receives the rotating operation in the state being pulled out from the initial position. The operation receiving unit 47 detects the push down operations of the push button switches B1 to B4 and the pull out, push and rotating operations of the crown C1, and outputs the input signal according to the type of the detected operation to the CPU 41.

As shown in FIG. 2, in addition to the above described configurations, the electronic timepiece 40 includes a CPU 41, a ROM (Read Only Memory) 42, a RAM (Random Access Memory) 43, an oscillation circuit 44, a dividing circuit 45, a counting circuit 46 (counting unit), an notification operation unit 48, a communicating unit 49, a motor drive circuit 50 and the like as the configurations according to the drive control. Commands and data are sent and received between these configurations via a bus 30.

The CPU 41 carries out various types of arrhythmic processing and which integrally controls the entire operation of the electronic timepiece 40. In the normal time point display state, the CPU 41 makes the hands 11 to 13 display the time point according to the date and time counted by the counting circuit 46 and makes the function hand 14 and the date wheel 19 display the day and the date. Further, the CPU 41 calls out the programs for carrying out the controlling according to various types of functions which are to be executed, including the stopwatch function, the timer function, the alarm notification function and the like.

In the ROM 42, the program 422 and the setting data according to the operation control of the electronic timepiece 40 are stored. In the ROM 42, the local time setting 421 for obtaining the time zone setting of a positing on the basis of the position information thereof and the summer time information according to the summer time implementing schedule, that is, for obtaining the time difference (time difference information) from the Universal Time Coordinates (UTC) which is the reference is stored. This local time setting includes the setting of latitudes, longitudes and altitudes of the cities which are the references for individual local times. The ROM 42 may include a non-volatile memory such as a flash memory in which data can be overwritten and updated. In such case, data can be rewritten according to the change in summer time information and the like.

The RAM 43 supplies the work memory space for the CPU 41, and is a volatile memory in which temporary data and setting data that can be updated are stored. This updatable setting data includes the present location information according to the user's location (present location). Further, as for the data that can be read, written and updated, the measuring history information 431 in the stopwatch function, the set time data in the timer function, and the timetable data 432 (predetermined schedule data) in which whether or whether not (yes/no) to execute the alarm notification operation (schedule notification operation) and one or a plurality of execution time point of the alarm notification operation are stored, and the like are included. As for the target of the alarm notification operation (schedule notification operation) which is to be stored in the timetable data 432, the sunrise and sunset time information of the above mentioned location and the like can be included. Further, as for the time point data which is stored in the timetable data 432, time data in which the date is designated and which indicates to execute the notification operation only once can be included. Furthermore, the time data which is to be stored in the timetable data 432 may include the settings regarding the notification operation which will be repeated every day at the same time point and the notification operation which will be repeated on the designated days of the week, such as only on week days.

The CPU 41, ROM 42 and RAM 43 can be formed on a single IC chip, and they, all together, form the processor 400 of the electronic timepiece (time display device) of the embodiment.

The oscillation circuit 44 generates a predetermined frequency signal and outputs the signal to the dividing circuit 45. As for the oscillation circuit 44, a crystal oscillator or the like is used, for example.

The dividing circuit 45 divides the frequency of the predetermined frequency signal which is input from the oscillation circuit 44, converts the divided frequency signal into a frequency signal (clock signal) which is to be used in the operation by the CPU 41 and the like, and outputs the converted frequency signal. The frequency to which the signal is to be converted can be changed according to the control command given by the CPU 41 or the like.

The counting circuit 46 counts and maintains the present date and time on the bases of the clock signal which is input from the dividing circuit 45. The date and time which is maintained by the counting circuit 46 may be a value counted according to the format unique to the electronic timepiece 40 or may be the date and time such as the UTC date and time which is the reference being maintained in the form of year, month, date, hour, minute and second.

The operation receiving unit 47 detects the pushed down state of the push button switches B1 to B4 and the pull out operation, rotating operation and push operation of the crown C1, converts the detection into electric signals and outputs the electric signals to the CPU 41.

The notification operation unit 48 carries out a predetermined notification operation for a user according to the control signal from the CPU 41. The notification operation unit 48 includes a beep sound output unit which generates a beep sound, a vibration generating unit which generates vibration and the like, for example. For each of the beep sound output unit and the vibration generating unit, well-known configurations such as a piezoelectric element, a motor with weight and the like can be used.

The communicating unit 49 carries out sending and receiving of data and controlling thereof when communicating with an external electronic device. For example, the communicating unit 49 can carry out a wireless communication with an external electronic device by Bluetooth (registered trademark), and can receive setting data (including the after-mentioned set time) from outside and can send and output the measuring history information 431 toward outside.

The motor drive circuit 50 outputs a drive voltage pulse for driving each of the stepping motors 51 to 55 and making it carryout stepping operation according to a control signal which is input from the CPU 41 at an appropriate timing and in an appropriate pulse width. The width of the drive voltage pulse can be adjusted as needed by a control signal from the CPU 41. Further, when a control signal for driving a plurality of stepping motors at the same time is input, the motor drive circuit 50 outputs the drive voltage pulses at different drive timings within the range that a problem will not occur according to the maximum load of the electronic timepiece 40.

Next, the operation according to measuring and display of time in the electronic timepiece 40 of the embodiment will be described.

In the electronic timepiece 40, the stopwatch function, the timer function and the alarm (schedule) notification function can be executed. When any of these functions is activated on the basis of user's operation (or automatically according to other operation, set operation and the like), the corresponding program 422 for controlling is read out from the ROM 42 and is executed. The CPU 41 measures (counts) the time elapsed from the measuring start timing by counting the divided signals of a predetermined frequency which are input from the dividing circuit 45.

With respect to these functions, the sub minute hand 15, the sub hour hand 16 and the sub 24-hour hand 17 are used to display the measured time, the set time point and the like in the electronic timepiece 40. Further, in the case where the seconds are to be displayed, the second hand 11 is used. In the case where the 1/20 seconds are to be displayed, the 1/20 second hand 18 is used to carry out such display. On the other hand, the minute hand 12 and the hour hand 13 continue to carry out the regular time point display. Further, in the case where a function mode other than the time point display is to be carried out, the function hand 14 carries out the auxiliary display regarding the measured time.

Figure 3:
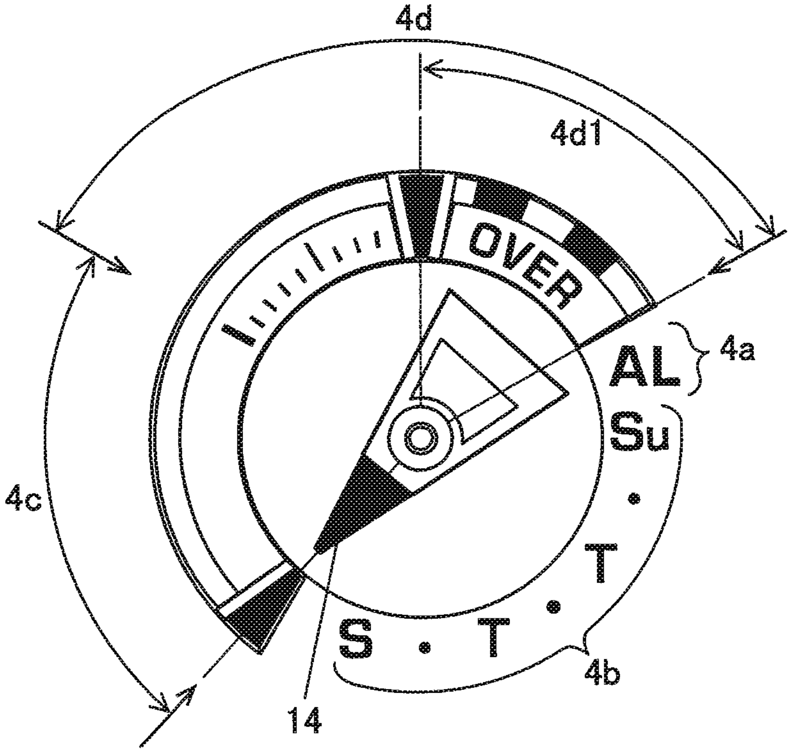
FIG. 3 is a plan view illustrating an enlarged view of the part near a small window that corresponds to the rotation range of a function hand.

FIG. 3 is a plan view illustrating an enlarged view of a part near the small window 4 which is formed in the dial 3 of the electronic timepiece 40 so as to correspond to the rotation range of the function hand 14.

The small window 4 is, at the edge thereof, provided with a function display region 4*a* in which the sign indicating the type of the function mode which is being executed is shown, a day display region 4*b* in which the sign indicating the present day is shown, a ratio display region 4*c* (the first display region) in which the remaining ratio (the ratio of the remaining time) with respect to the set time (the reference set time) of the time which is being measured (elapsed time) is shown, and a remaining time display region 4*d* (the second display region) in which the remaining time with respect to the set time of the time which is being measured is shown. For the auxiliary display relating to the measured time, the ratio display region 4*c* and the remaining time display region 4*d* are used.

Here, the sign "AL" according to the alarm notification function (AL) is set in the function display region 4*a*. However, this is not limitative in any way. For example, the configuration may be such that the sign according to the timer function TR and the stopwatch function SW can be set, and they can be individually indicated by the function hand 14 when setting the reset status, the set time for the timer, the set time of the aimed time in the stopwatch function and the like.

In the case where the timer function (TR) is executed, the remaining time will be countdown from the time set by a user (reference set time). At this time, the remaining hours and minutes during the countdown are displayed by the sub minute hand 15 and the sub hour hand 16. Further, in the case where the set time is short or in the case where the remaining time to be counted is short, display of the remaining seconds by the second hand 11 can also be carried out. At the same time, the ratio of the remaining time with respect to the set time will be displayed by the corresponding ratio position in the ratio display region 4*c* being indicated by the function hand 14. Further, when the remaining time becomes equal to or less than a predetermined reference time (reference remaining time), the indication range of the function hand 14 is shifted to the remaining time display region 4*d* and the countdown display is carried out by making the function hand 14 indicate the position according to the remaining time.

In the case where the stopwatch function (SW) is executed, the regular counted time (measured time) which is counted starting from the measuring start timing is displayed by the sub minute hand 15, the sub hour hand 16, the sub 24-hour hand 17, the second hand 11 and the 1/20 second hand 18. On the other hand, with respect to the difference (time difference, remaining time) between the set time (reference set time) of the lap time (cycle time) which is set by a user and the lap time (present lap, elapsed time) which is being counted or the time difference between the set time of the total time (summed time) and the sum of the measured time which is being counted, the function hand 14 is made to indicate the position in the ratio display region 4*c* that corresponds to the remaining ratio of the time difference with respect to the set time. Further, in the case where the time difference is equal to or less than a predetermined reference remaining time, the function hand 14 is made to indicate the position that corresponds to the time difference in the remaining time display region 4*d*. In such case, there is a possibility that the present lap and the elapsed time may overrun the set time. In the case where the elapsed time is within a predetermined range (less than the upper limit value), the position that corresponds to the elapsed time in the overrun time display region 4*d*1 (overrun display region) in the remaining time display region 4*d* is indicated by the function hand 14. In the case where the elapsed time is greater than the upper limit value, the function hand 14 is made to stop at the position that corresponds to the maximum upper limit value which can be displayed.

Here, the remaining time display region 4*d* includes a scale for carrying out the countdown display for 10 steps. With respect to this 10 steps, this can be switched between "10 seconds" and "10 minutes" according to the set time (can be set by choosing from a plurality of candidate times) or can be fixed to "10 seconds", for example. Alternatively, the above mentioned 10 steps can be changed according to the difference in digits such as "10 seconds" and "100 seconds". However, it is preferred that a user can easily be aware of the specific display content associated with the countdown time. Here, when carrying out the counting in the timer function, the remaining time display in the remaining time display region 4*d* and the actual remaining time display by the sub minute hand 15 and the second hand 11 may be same. However, the time corresponding to the 10 steps can be set so that the remaining time display in the remaining time display region 4*d* and the actual remaining time display by the sub minute hand 15 and the second hand 11 be carried out differently.

Input of the set time is carried out by receiving a predetermined operation by the operation receiving unit 47 or by obtaining from an external electronic device via the communicating unit 49. If the operation receiving unit 47 is used, the set time is set by forwarding or rewinding the time by rotating the crown C1 in the state where the crown C1 is pulled out by one section. Although the set time will be displayed in minutes by the sub minute hand 15 and the sub hour hand 16 here, the set time can be displayed in seconds by using the second hand 11 in addition. By the crown C1 being pushed from the pulled out state as the setting end operation, the set time is finalized. If the communicating unit 49 is used, for example, by the push button switch B2 being pressed down for a predetermined time period, communication connection with an electronic device such as a smartphone which is preset as the communication target is established, and the schedule data and the set time data as well as the present date and time information and the present location information can be obtained.

Figure 4:
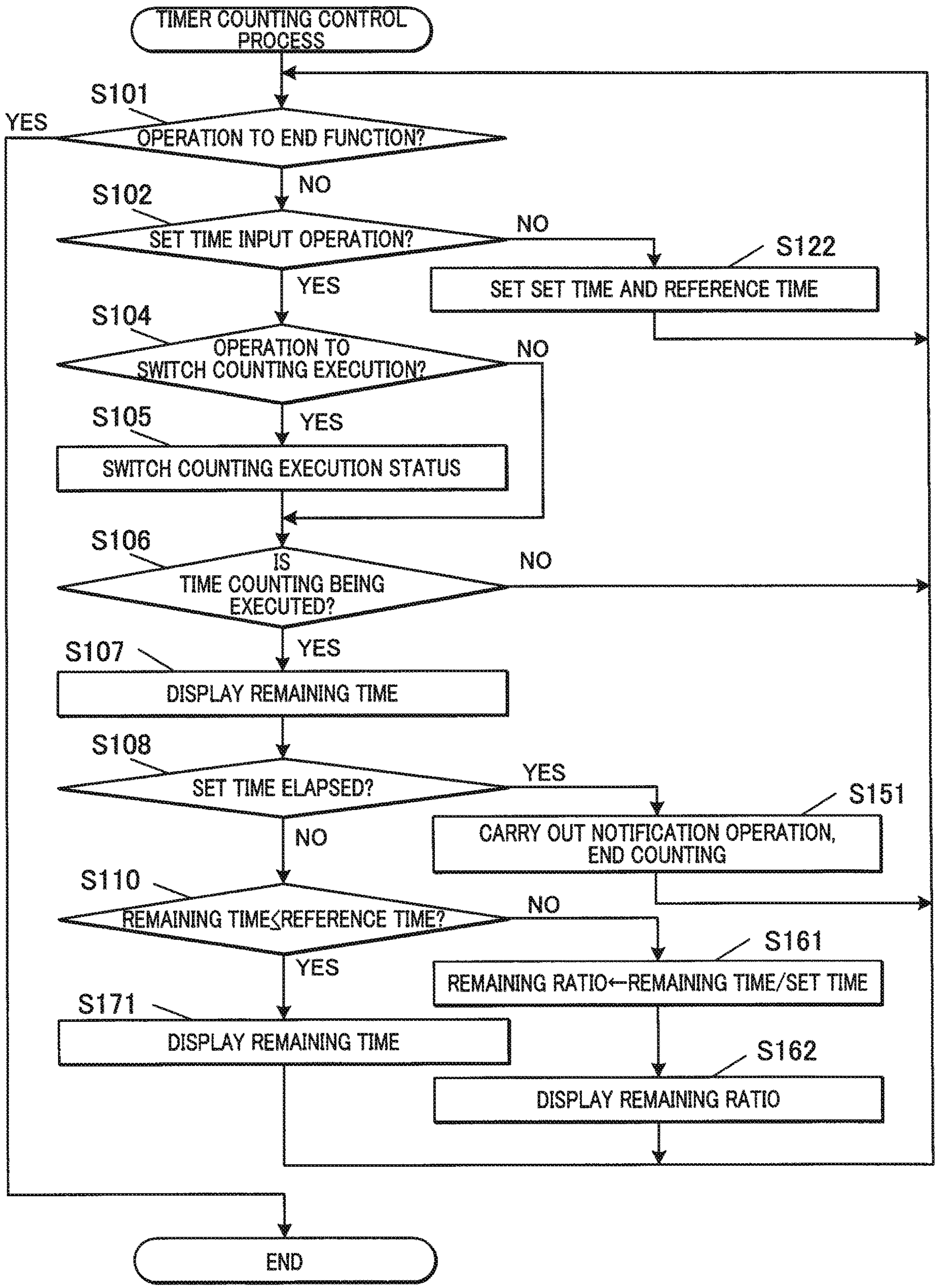
FIG. 4 is a flowchart showing a control procedure of a timer counting control process.

FIG. 4 is a flowchart showing a control procedure which is carried out by the CPU 41 (processor 400) in the timer counting control process which is executed in the electronic timepiece 40 of the embodiment.

This timer counting control process starts according to the command to switch to the timer function mode made by the operation receiving unit 47. When the timer counting control process starts, the CPU 41 (processor 400) determines whether the ending operation of the timer function is detected (step S101). If it is determined that the ending operation of the timer function is detected (YES in step S101), the CPU 41 ends the timer counting control process.

If it is determined that the ending operation of the timer function is not detected (NO in step S101), the CPU 41 determines whether the input operation of a set time is detected (step S102). If it is determined that the input operation of a set time is detected (YES in step S102), the CPU 41 sets the set time and the reference time which is determined according to the set time and stores the set time and the reference time in the RAM 43 (step S122). Thereafter, the process of the CPU 41 returns to step S101.

If it is determined that the input operation of a set time is not detected (NO in step S102), the CPU 41 determines whether the switching operation of the time counting execution state, that is, the switching operation between executing of the countdown of the set time (command operation to start counting or restart counting) and stopping of the countdown of the set time (command operation to end counting or stop counting) is received by the operation receiving unit 47 (step S104). If it is determined that the switching operation is detected (YES in step S104), the CPU 41 carries out switching of the time counting execution state (step S105). That is, the CPU 41 temporarily stops the countdown if the countdown is being executed and starts (restarts) the countdown if the countdown is not yet started or is temporarily stopped. Thereafter, the process of the CPU 41 moves onto step S106. If it is determined that the switching operation of the time counting execution state is not detected (NO in step S104), the process of the CPU 41 moves onto step S106.

When moved onto the process of step S106, the CPU 41 determines whether the time counting is being executed (step S106). If it is determined that the time counting is not being executed (NO in step S106), the process of the CPU 41 returns to step S101. If it is determined that the time counting is being executed (YES in step S106), the CPU 41 displays the remaining time of the countdown (step S107). That is, the CPU 41 outputs a control signal to the motor drive circuit 50 and makes the second hand 11, the sub minute hand 15, the sub hour hand 16 and the sub 24-hour hand 17 operate to display the remaining time.

The CPU 41 determines whether the counted time has overrun the set time, that is, whether the remaining time which was counted down has become "0" (step S108). If it is determined that the counted time has overrun the set time (YES in step S108), the CPU 14 makes the notification operation unit 48 carry out a predetermined notification operation and ends the countdown operation (step S151). Here, in the case where the mode set is such that to prohibit the notification operation, for example, to prohibit output of the beep sound, the CPU 41 can omit the execution control of the notification operation. Further, the CPU 41 resets the counted value and the display, that is, the CPU 41 returns the counted time to the previous set time. Thereafter, the CPU 41 returns the process to step S101.

If it is determined that the counted time has not overrun the set time (NO in step S108), the CPU 41 determines whether the remaining time is equal to or less than the reference time (step S110). If it is determined that the counted time is not equal to or less than the reference time (NO in step S110), the CPU 41 calculates the ratio of the remaining time with respect to the set time as the remaining ratio (step S161). The CPU 41 outputs a control signal to the motor drive circuit 50, as needed, to drive the stepping motor 53, and then makes the function hand 14 indicate the position that corresponds to the calculated remaining ratio in the ratio display region 4*c* (step S162). Thereafter, the process of the CPU 41 returns to step S101.

If it is determined that the remaining time is equal to or less than the reference time (YES in step S110), the CPU 41 outputs a control signal to the motor drive circuit 50, as needed, and makes the function hand 14 indicate the position that corresponds to the remaining time which is being counted in the remaining time display region 4*d* (step S171). Thereafter, the process of the CPU 41 returns to step S101.

Figure 5:
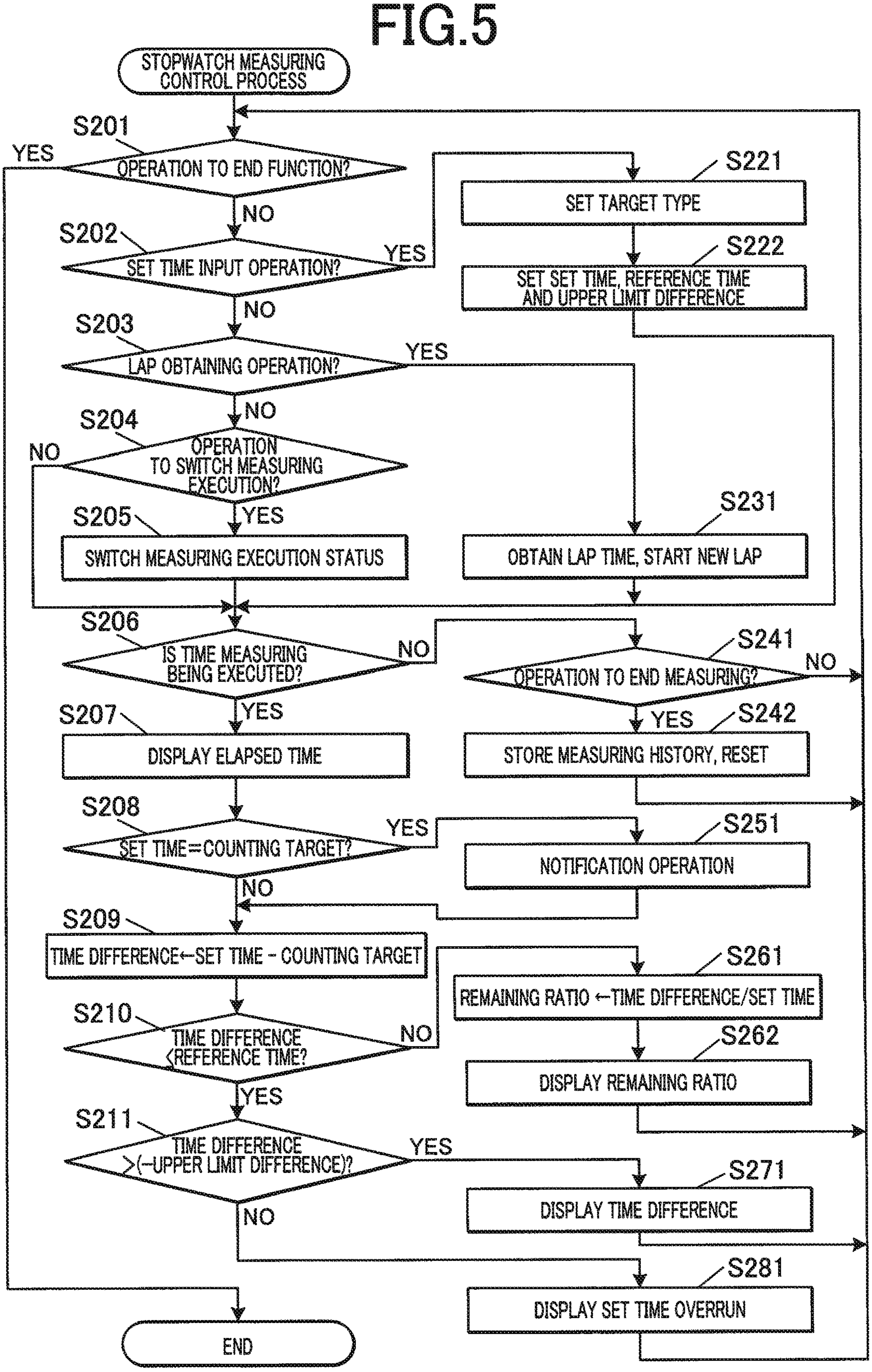
FIG. 5 is a flowchart showing a control procedure of a stopwatch measuring control process.

FIG. 5 is a flowchart showing a control procedure which is carried out by the CPU 41 (processor 400) in the stopwatch measuring control process which is executed in the electronic timepiece 40 of the embodiment.

This stopwatch measuring control process starts according to the switching command to the stopwatch function mode made by the operation receiving unit 47. When the stopwatch measuring control process starts, the CPU 41 determines whether the ending operation of the stopwatch function is detected (step S201). If it is determined that the ending operation is detected (YES in step S201), the CPU 41 ends the stopwatch measuring control process.

If it is determined that the ending operation is not detected (NO in step S201), the CPU 41 determines whether the input operation of the set time of the lap time or total time is detected (step S202). If it is determined that the input operation is detected (YES in step S202), the CPU 41 sets the target type, that is, the CPU 41 sets the lap time or the total time (step S221). Further, the CPU 41 sets the set time according to the target type and sets the reference time and the upper limit difference according to the set time (step S222). Thereafter, the process of the CPU 41 moves onto step S206.

If it is determined that the input operation of the set time is not detected (NO in step S202), the CPU 41 determines whether the obtaining operation of the lap time is detected (step S203). If it is determined that the obtaining operation of the lap time is detected (YES in step S203), the CPU 41 obtains the lap time and starts to measure a new lap (step S231). Thereafter, the process of the CPU 41 moves onto step S206.

If it is determined that the obtaining process of the lap time is not detected (NO in step S203), the CPU 41 determines whether an operation according to execution switching of time measuring is detected, that is, whether the switching operation between temporarily stopping or terminating of the time measuring in the stopwatch and starting or restarting of the time measuring in the stopwatch is detected (step S204). If it is determined that the switching operation is detected (YES in step S204), the CPU 41 starts or restarts the measuring from the state just before the measuring or from the interrupted state, or interrupts or terminates the measuring in the middle of the measuring state (step S205). Thereafter, the process of the CPU 41 moves onto step S206. If it is determined that the switching operation is not detected (NO in step S204), the process of the CPU 41 moves onto step S206.

When switched from the process of any of steps S222, S231, S204 and S205 to the process of step S206, the CPU 41 determines whether the time measuring is being executed (step S206). If it is determined that the measuring is not being executed, that is, if it is determined that the measuring is being interrupted (terminated) (NO in step S206), the CPU 41 determines whether the ending operation of the measuring is detected (step S241). If it is determined that the ending operation is detected (YES in step S241), the CPU 41 stores the measurement result in the measuring history information 431 and resets the present measurement result and the display (step S242). Thereafter, the process of the CPU 41 returns to step S201. If it is determined that the ending operation of the measuring is not detected (NO in step S241), the process of the CPU 41 returns to step S201.

In the determining process of step S206, if it is determined that time measuring is being executed (YES in step S206), the CPU 41 outputs a control signal to the motor drive circuit 50, and makes the second hand 11, the sub minute hand 15, the sub hour hand 16, the sub 24-hour hand 17 and the 1/20 second hand 18 display the elapsed time since the measuring started (step S207).

The CPU 41 determines whether the elapsed time according to the setting target of the set time, that is, the total elapsed time or the elapsed time of the present lap period (described as the present lap) equals to the set time (step S208). If it is determined that the elapsed time is equal to the set time (YES in step S208), the CPU 41 makes the notification operation unit 48 carry out a predetermined notification operation (step S251). Thereafter, the process of the CPU 41 moves onto step S209. If it is determined that the elapsed time is not equal to the set time (NO in step S208), the process of the CPU 41 moves onto step S209.

When moved onto the process of step S209, the CPU 41 calculates the time difference which is obtained by subtracting the elapsed time according to the setting target from the set time (step S209). This time difference is a negative value if the elapsed time is greater than the set time. The CPU 41 determines whether the calculated time difference is equal to or less than the reference time (step S210). If it is determined that the calculated time difference is not equal to or less than the reference time (NO in step S210), the CPU 41 obtains the ratio of the time difference with respect to the set time as the remaining ratio (step S261). The CPU 41 outputs a control signal to the motor drive circuit 50 and makes the function hand 14 indicate the position in the ratio display region 4*c* that corresponds to the calculated remaining ratio (step S262). Thereafter, the process of the CPU 41 returns to step S201.

If it is determined that the time difference is equal to or less than the reference time (YES in step S210), the CPU 41 determines whether the time difference is greater than the value obtained by reversing the positive/negative sign of the upper limit value (positive value) (step S211). That is, the CPU 41 determines whether the time by which the elapsed time has overrun the set time is less than the upper limit value. If it is determined that the time difference is greater than the value obtained by reversing the positive/negative sign of the upper limit value (the elapsed time has not overrun the set time by the upper limit value or greater (including the case where the elapsed time is equal to or less than the set time)) (YES in step S211), the CPU 41 outputs a control signal to the motor drive circuit 50, as needed, and makes the function hand 14 indicate the position that corresponds to the time difference in the remaining time display region 4*d* (step S271). Thereafter, the process of the CPU 41 returns to step S201.

If it is determined that the time difference is not greater than the value obtained by reversing the positive/negative sign of the upper limit value (is equal to or less than the value obtained by reversing the positive/negative sign of the upper limit value) (the elapsed time has overran the set time by the upper limit value or greater) (NO in step S211), the CPU 41 makes the function hand 14 indicate the maximum elapsed time position in the overrun time display region 4*d*1 to indicate that the set time has already been overrun (step S281). Thereafter, the process of the CPU 41 returns to step S201.

Figure 6:
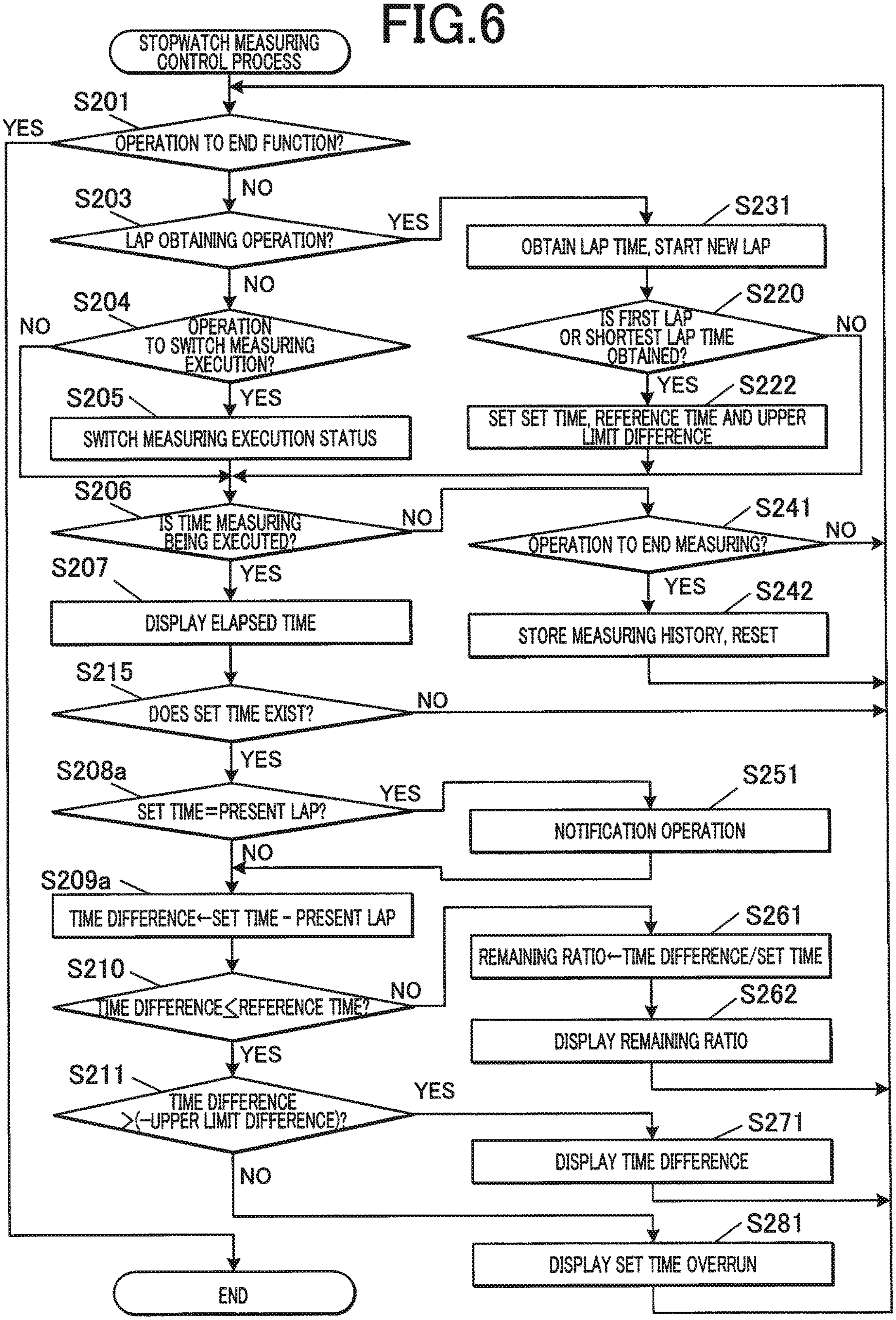
FIG. 6 is a flowchart showing another example of the control procedure of the stopwatch measuring control process.

FIG. 6 is a flowchart showing another example of the control procedure which is carried out by the CPU 41 (processor 400) in the stopwatch measuring control process.

In this another example, the set time which is set as the comparison target is selected from the lap times (measured times) which are measured by the device itself while the stopwatch function is being executed (within a predetermined period of time) on the basis of a predetermined condition. Here, as a predetermined condition, the lap time of the first cycle and the shortest lap time in the plurality of cycles are updated on a real-time basis as the set time.

With such operation, in the stopwatch measuring control process of this example, the processes of steps S202 and S221 are omitted and, instead, the processes of steps S215 and S220 are added and the process position of the step S231 is changed comparing to the stopwatch measuring control process shown in FIG. 5. Further, the processes of steps S208 and the S209 are respectively changed to the processes of steps S208*a* and S209*a*. The other processes are the same in both examples. The similar symbols are used for the similar processes and their detail description is omitted.

When branching to "NO" in the determining process of step S201, the process of the CPU 41 moves onto step S203. When branching to "YES" in the determining process of step S203, the CPU 41 obtains the lap time and starts measuring the next new lap period (step S231). The CPU 41 determines whether the obtained lap time is the first lap time in the stopwatch measuring control process which is presently being executed or is the shortest lap time in a plurality of lap times (step S220). If it is determined that the obtained lap time is neither of them (NO in step S220), the process of the CPU 41 moves onto step S206. If it is determined that the obtained lap time is one of them (YES in step S220), the CPU 41 sets this lap time as the set time and sets the reference time and the upper limit difference according to the set time (step S222). Thereafter, the process of the CPU 41 moves onto step S206.

After step S207, the CPU 41 determines whether there exists a set time (step S215). If the set time does not exist, that is, if the lap time of the first cycle is being measured and it is determined that the set time is not yet set (NO in step S215), the process of the CPU 41 returns to step S201.

If it is determined that the set time is set (YES in step S215), the CPU 41 determines whether the present lap is equal to the set time (step S208*a*). If it is determined that the present lap is equal to the set time (YES in step S208*a*), the CPU 41 executes the process of step S251 and moves onto the process of step S209*a*. If it is determined that the present lap is not equal to the set time (NO in step S208*a*), the process of the CPU 41 moves onto step S209*a*.

When moved onto the process of step S209*a*, the CPU 41 calculates the time difference by subtracting the present lap from the set time (step S209*a*). Thereafter, the process of the CPU 41 moves onto step S210.

Figure 7:
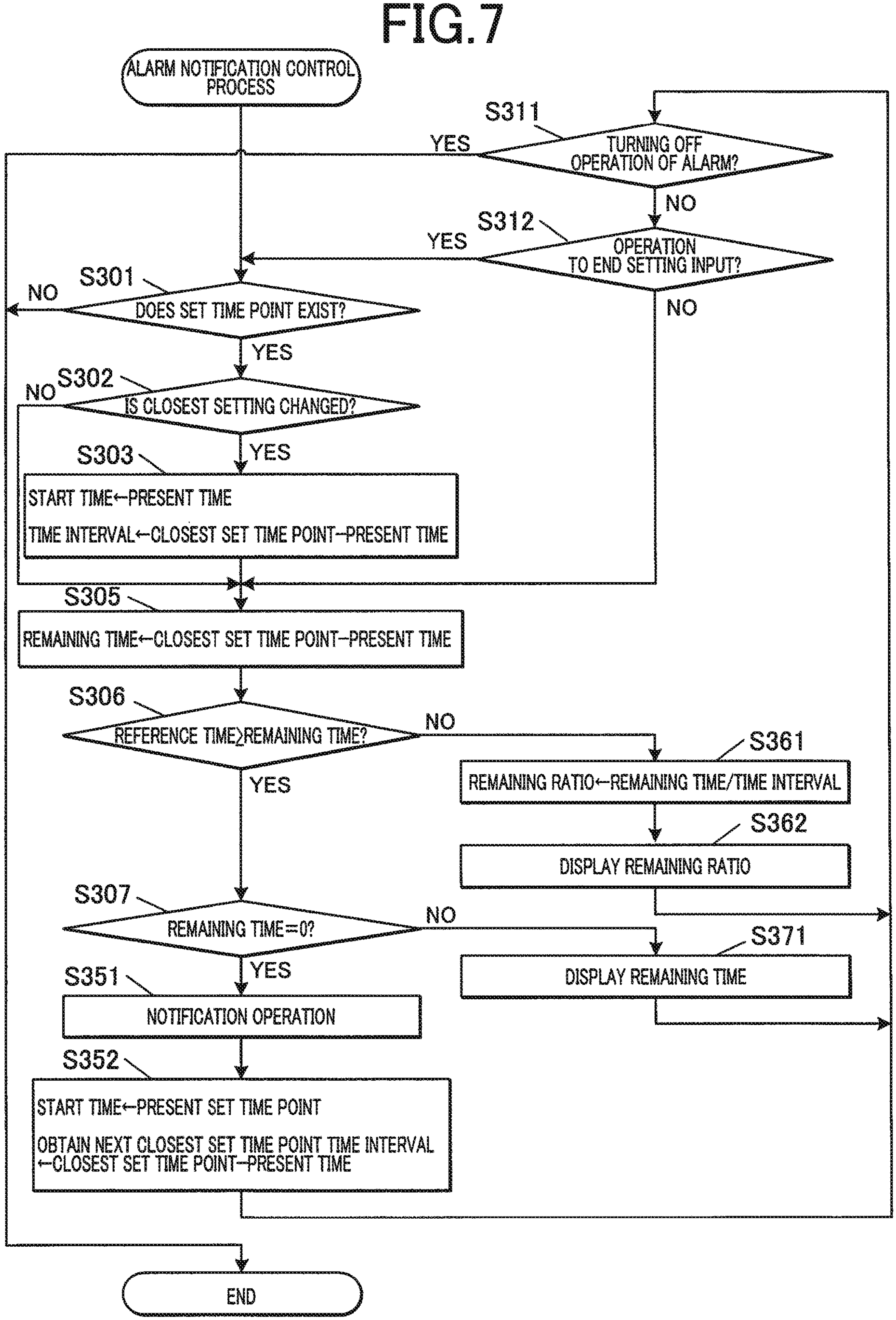
FIG. 7 is a flowchart showing a control procedure of an alarm notification control process.

FIG. 7 is a flowchart showing the control procedure which is carried out by the CPU 41 (processor 400) in the alarm notification control process executed in the electronic timepiece 40 in the embodiment.

In this alarm notification control process, the display control of the remaining time on the basis of the next schedule time point (time point to execute the schedule notification operation) is carried out instead of the control on the basis of the remaining time which is counted down from the set time in the timer counting control process shown in FIG. 4. That is, the schedule time point is the time point of the measuring end timing. Therefore, in such case, counting of the elapsed time will not be interrupted. Here, the reference time is preset as a fixed value (for example, 10 minutes). The schedule for the alarm notification operation can be obtained either by the reception of a predetermined operation by the operation receiving unit 47 and from an external electronic device via the communicating unit 49. The schedule for the alarm notification operation can be set in the similar way as the way in which the set time is set in the above described timer function and stopwatch function. Further, as for the after-mentioned sunrise and sunset times, they are calculated and set by the CPU 41. The schedule data can be set so as to be equal to or less than a predetermined upper limit according to the storage capacity of the timetable data 432 (the storage capacity that can be allocated to the timetable data 432 in the RAM 43).

The alarm notification control process starts by the operation to turn on the alarm notification operation being carried out. When the alarm notification control process starts, the CPU 41 determines whether there is a set time point for executing the alarm notification operation (step S301). If it is determined that there is no set time point for executing the notification (NO in step S301), the CPU 41 ends the alarm notification control process. At this time, the CPU 41 may release the on setting of the alarm notification operation (may switch it off).

If it is determined that there is a set time point for executing the notification (YES in step S301), the CPU 41 determines whether the set time point which is presently set for the closest alarm notification operation has been changed (includes the case where switched to the alarm notification operation where the set time point is the notification target as a result of the alarm notification operation being changed to on from off) (step S302). If it is determined that the set time point for the closest alarm notification operation has been changed (YES in step S302), the CPU 41 sets the present time as the start time and sets the difference (time difference) between the changed closest set time point and the present time (a predetermined measuring start timing) as the time interval (reference set time) (step S303). Thereafter, the process of the CPU 41 moves onto step S305. If it is determined that the closest alarm notification operation time point has not been changed (NO in step S302), the process of the CPU 41 moves onto step S305.

When moved onto the process of step S305, the CPU 41 obtains the difference between the closest set time point and the present time and sets the obtained difference as the remaining time (remaining time of the elapsed time) (step S305). The CPU 41 determines whether this remaining time is equal to or less than the reference time (step S306). If it is determined that the remaining time is not equal to or less than the reference time (NO in step S306), the CPU 41 calculates the ratio of the remaining time with respect to the time interval as the remaining ratio (step S361). The CPU 41 outputs a control signal to the motor drive circuit 50, as needed, and makes the function hand 14 indicate the position that corresponds to the calculated remaining ratio in the ratio display region 4*c* (step S362). Thereafter, the process of the CPU 41 moves onto step S311.

If it is determined that the remaining time is equal to or less than the reference time (YES in step S306), the CPU 41 determines whether the remaining time is "0" (step S307). If it is determined that the remaining time is not "0" (NO in step S307), the CPU 41 outputs a control signal to the motor drive circuit 50, as needed, and makes the function hand 14 indicate the position that corresponds to the remaining time in the remaining time display region 4*d* (step S371). Thereafter, the process of the CPU 41 moves onto step S311.

If it is determined that the remaining time is "0" (including the case where the remaining time is a small value which is equal to or less than "0" according to the processing interval) (YES in step S307), the CPU 41 outputs a control signal to the notification operation unit 48 and makes the notification operation unit 48 carry out a predetermined notification operation (step S351). The content of the notification operation may be switched between generating a beep sound and generating vibration on the basis of whether the audio output is prohibited. The CPU 41 sets the present set time point according to the notification operation as the new start time (the next measuring start timing), and obtains the closest set time point according to the next notification operation setting (the next measuring end timing according to the timetable data 432). Further, the CPU 41 calculates the time interval by subtracting the start time from the obtained closest set time point (step S352). Thereafter, the process of the CPU 41 moves onto step S311.

When moved onto the process of step S311 from step S362, S371 or S352, the CPU 41 determines whether the turning off operation of the alarm notification operation is detected (step S311). If it is determined that the turning off operation is detected (YES in step S311), the CPU 41 ends the alarm notification control process. If it is determined that the turning off operation is not detected (NO in step S311), the CPU 41 determines whether the input end operation of a setting according to the alarm notification operation is detected (step S312). If it is determined that the input end operation is detected (YES in step S312), the process of the CPU 41 moves onto step S301. If it is determined that the input end operation is not detected (NO in step S312), the process of the CPU 41 moves onto step S305.

As described above, in the electronic timepiece 40 of the embodiment, the setting of the alarm notification operation time point which is the next notification target or thereafter is not always displayed and it can be confirmed and changed in the setting input state.

Figure 8:
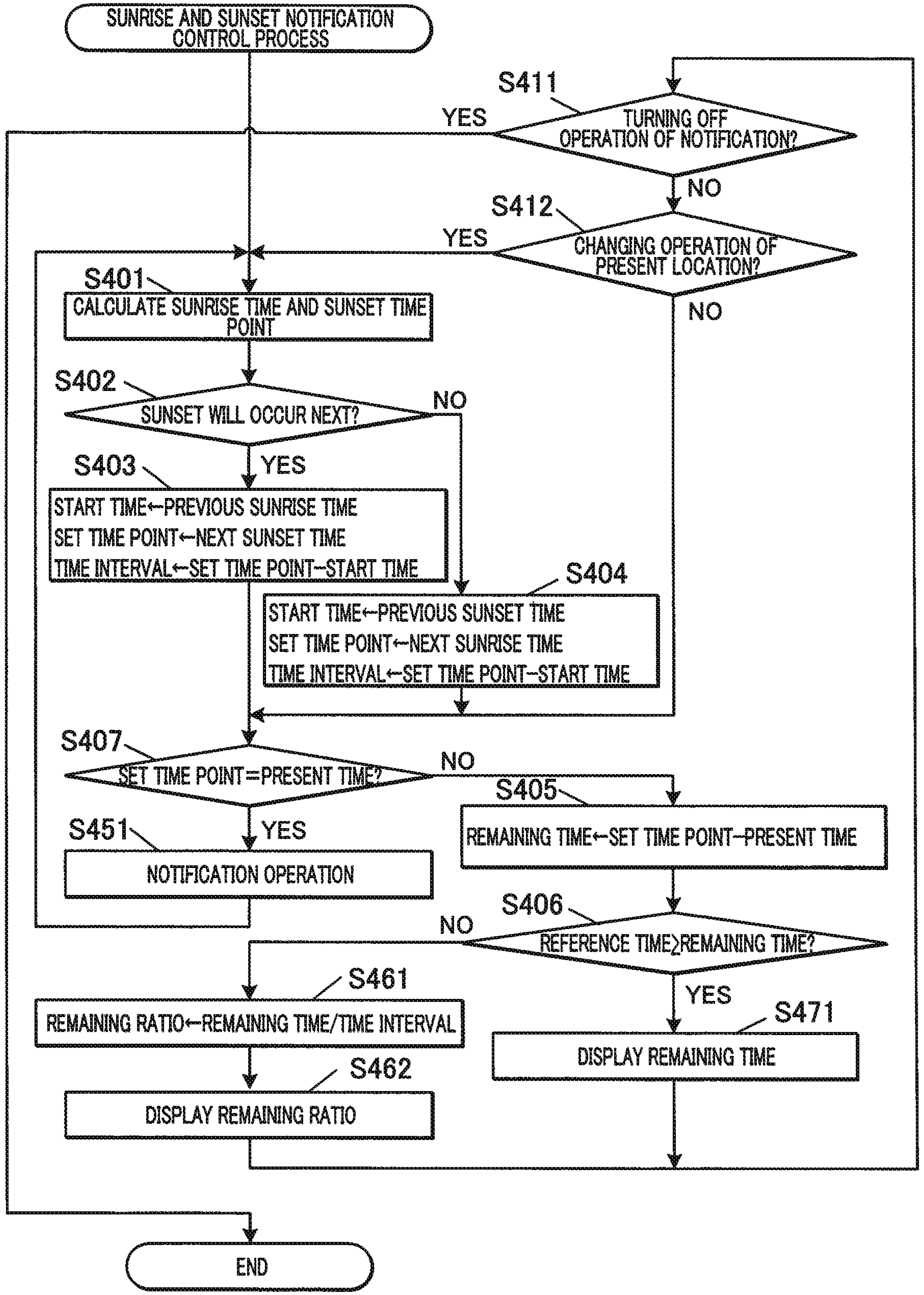
FIG. 8 is a flowchart showing a control procedure of a sunrise and sunset notification control process.

FIG. 8 is a flowchart showing a control procedure which is carried out by the CPU 41 (processor 400) in the sunrise and sunset notification control process which is executed in the electronic timepiece 40 of the embodiment. The sunrise and sunset notification control process starts according to the turning on operation of the notification operation.

When the sunrise and sunset notification control process starts, the CPU 41 calculates the last sunrise/sunset time and the closest sunrise/sunset time which will come next (step S401). Alternatively, if the data of the sunset time and sunrise time can be obtained from an external electronic device via the communicating unit 49 in advance, the CPU 41 may obtain and store the times in advance.

The CPU 41 determines whether sunset will occur next (that is, whether it is daytime now) (step S402). If it is determined that sunset will occur next (YES in step S402), the CPU 41 sets the previous sunrise time as the start time and sets the next sunset time as the set time point. Further, the CPU 41 calculates the time interval by subtracting the start time from the set time point (step S403). Thereafter, the process of the CPU 41 moves onto step S407.

If it is determined that sunset will not occur next (that is, it is night time now) (NO in step S402), the CPU 41 sets the previous sunset time as the start and sets the next sunrise time as the set time point. Further, the CPU 41 calculates the time interval by subtracting the start time from the set time point (in the case where the dates of the set time point and the start time are different, the difference in date will be taken into consideration) (step S404). Thereafter, the process of the CPU 41 moves onto step S407.

When moved onto the process of step S407, the CPU 41 determines whether the present time is the set time point (step S407). If it is determined that the present time is the set time point (YES in step S407), the CPU 41 outputs a control signal to the notification operation unit 48 to carry out a predetermined notification operation (step S451). Thereafter, the process of the CPU 41 returns to step S401.

If it is determined that the present time is not the set time point (NO in step S407), the CPU 41 subtracts the present time from the set time point (in the case where the dates of the set time point and the present time are different, the difference in date will be taken into consideration) to calculate the remaining time till the set time point (step S405). The CPU 41 determines whether the remaining time is equal to or less than the reference time (step S406). If it is determined that the remaining time is not equal to or less than the reference time (NO in step S406), the CPU 41 calculates the ratio of the remaining time with respect to the time interval as the remaining ratio (step S461). The CPU 41 outputs a control signal to the motor drive circuit 50, as needed, and makes the function hand 14 indicate the position that corresponds to the remaining ratio in the ratio display region 4*c* (step S462). Thereafter, the process of the CPU 41 moves onto step S411.

If it is determined that the remaining time is equal to or less than the reference time (YES in step S406), the CPU 41 outputs a control signal to the motor drive circuit 50, as needed, and makes the function hand 14 indicate the position that corresponds to the remaining time in the remaining time display region 4*d* (step S471). Thereafter, the process of the CPU 41 moves onto step S411.

When moved onto the process of step S411 from step S462 or S471, the CPU 41 determines whether the turning off operation of the sunrise and sunset notification operation is detected (step S411). If it is determined that the turning off operation is detected (YES in step S411), the CPU 41 ends the sunrise and sunset notification control process. If it is determined that the turning off operation is not detected (NO in step S411), the CPU 41 determines whether the changing operation of the present location of the electronic timepiece 40 (that is, the local time setting) is detected (step S412). If it is determined that the changing operating is detected (YES in step S412), the process of the CPU 41 moves onto step S401. If it is determined that the changing operation of the present location is not detected (NO in step S412), the process of the CPU 41 moves onto step S407.

Figure 9:
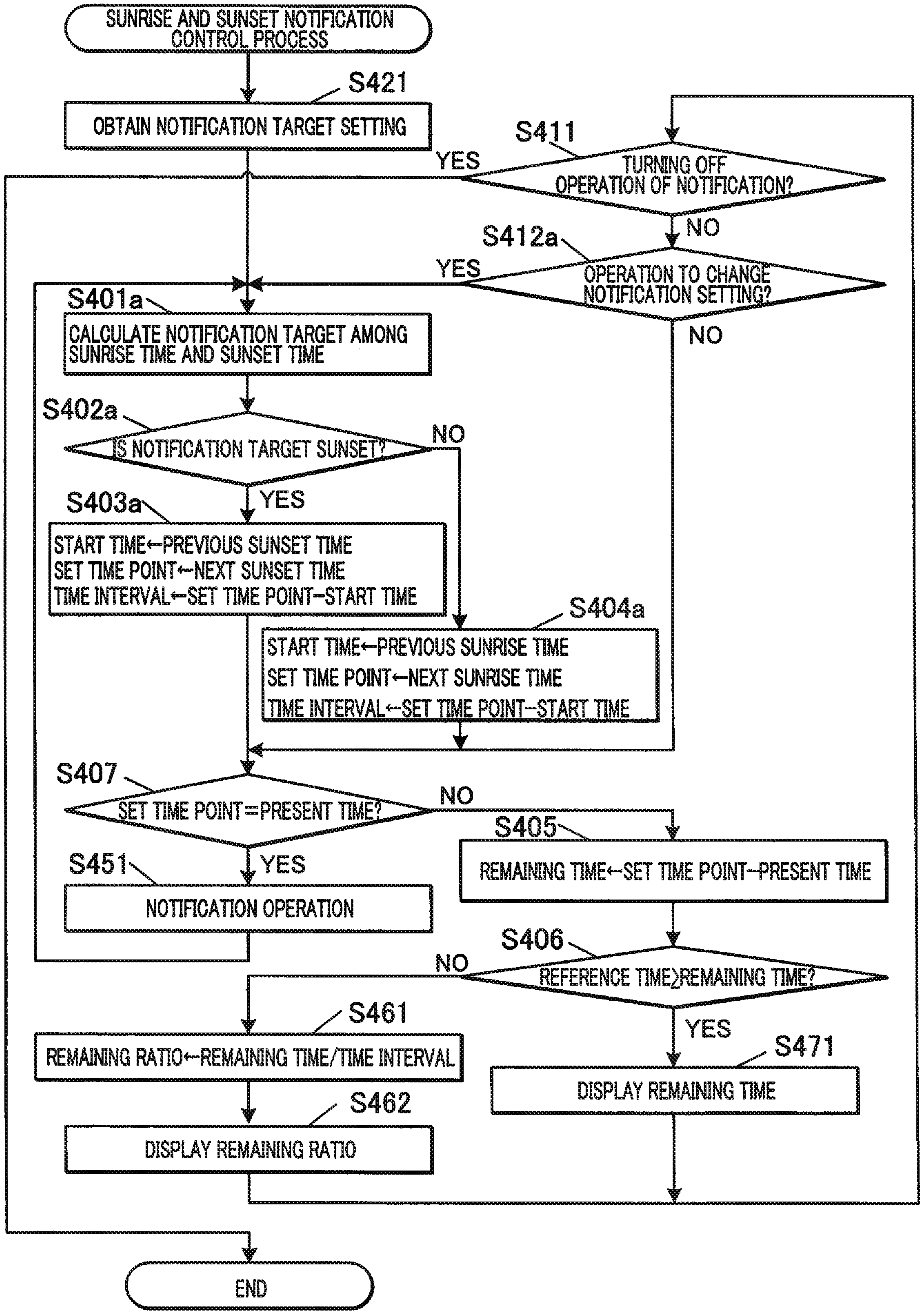
FIG. 9 is a flowchart showing another example of the control procedure of the sunrise and sunset notification control process.

FIG. 9 is a flowchart showing another example of the control procedure which is carried out by the CPU 41 (processor 400) in the sunrise and sunset notification control process.

In the sunrise and sunset notification control process, with respect to only one of the sunrise and sunset which is set, the remaining ratio and the remaining time with respect to the time interval between the relevant time point within the day (within the previous day) and the relevant time point within the next day (within the day) are selectively displayed. With such operation, comparing to the sunrise and sunset notification control process shown in FIG. 8, the process of step S421 is added to the sunrise and sunset notification control process of FIG. 9. Further, the sunrise and sunset notification control process shown in FIG. 8 and the the sunrise and sunset notification control process of FIG. 9 are the same except for the processes of steps S401, S402, S403, S404 and S412 respectively being replaced by the processes of steps S401*a*, S402*a*, S403*a*, S404*a* and S412*a*. Furthermore, the same symbols are used for the similar processes and their detail description is omitted.

When the sunrise and sunset notification control process starts, the CPU 41 obtains the setting regarding weather the notification target is sunset time or sunrise time (step S421). The CPU 41 at least calculates the time point of the notification target among sunrise time and sunset time (step S401*a*). The CPU 41 determines whether the notification target is sunset time (step S402*a*).

If it is determined that the notification target is sunset time (YES in step S402*a*), the CPU 41 sets the previous sunset time as the start time and sets the next sunset time as the set time point. Further, the CPU 41 subtracts the start time from the set time point (take the date difference into consideration when the dates are different) and calculates the time interval (step S403*a*). Thereafter, the process of the CPU 41 moves onto step S407.

If it is determined that the notification target is not sunset time (the notification target is sunrise time) (NO in step S402*a*), the CPU 41 sets the previous sunrise time as the start time and sets the next sunrise time as the set time point. Further, the CPU 41 subtracts the start time from the set time point (take the date difference when the dates are different) and calculates the time interval (step S404*a*). Thereafter, the process of the CPU 41 moves onto step S407.

In the determining process of step S411, if it is determined that the turning off operation of the notification operation is not detected (NO in step S411), the CPU 41 determines whether the operation to change the setting regarding the notification content is detected (step S412*a*). The setting regarding the notification content includes the changing of the present location and switching of the notification target between sunset and sunrise. If it is determined that the operation to change the setting regarding the notification content is detected (YES in step S412*a*), the process of the CPU 41 moves onto step S401*a*. If it is determined that the operation to change the setting regarding the notification content is not detected (NO in step S412*a*), the process of the CPU 41 moves onto step S407.

Among the above described processes, steps S162, S262, S362 and S462 comprise the ratio display step (ratio display unit) in the time display control method (program) which is carried out by the electronic timepiece 40 (time display device) of the embodiment, and steps S171, S271, S371 and S372 comprise the remaining time display step (remaining time display unit) in the time display control method (program) which is carried out by the electronic timepiece 40 (time display device) of the embodiment.

As described above, the electronic timepiece 40 which is the time display device of the embodiment includes the hands 11 to 19 and the dial 3 which comprise the indication display unit that displays the content according to the indicating operation, and the CPU 41, the RPM 42 and the RAM 43 which comprise the processor 400. If the remaining time with respect to the set time of the elapsed time from the measuring start timing is greater than a predetermined reference time, the processor 400 makes the indication display unit display the ratio of the remaining time with respect to the set time. If the remaining time is equal to or less than the reference time, the processor 400 makes the indication display unit display the remaining time.

In such way, by switching between displaying the ratio when the remaining time is adequately large and displaying the actual remaining time when the remaining time become lesser, more appropriate value for a user to determine the remaining time is displayed according to the size (length) of the remaining time. Therefore, a user can easily be aware of the measurement status of the remaining time with respect to the set time through senses.

Further, the indication display unit includes the ratio display region 4*c* in which the ratio of the remaining time with respect to the reference time is indicated and the remaining time display region 4*d* in which the remaining time is indicated. In such way, by displaying the remaining ratio or the remaining time by having individual regions, a user can easily be aware of which display is being carried out and which value is being indicated.

Furthermore, the indication display unit includes the overrun time display region 4*d*1 in which display regarding the elapsed time is carried out when the elapsed time has overrun the set time. That is, in the stopwatch function and the like, how much the measured time has overrun the set time can be displayed in the case where the measured time has overrun the set time. In such way, a user can easily and appropriately be aware of how much the measured time is greater or less with respect to the set time.

Moreover, the electronic timepiece 40 includes the communicating unit 49 which receives information regarding a set time from outside.

Therefore, in the case especially when setting a plurality of set times or the like in the electronic timepiece 40, the accurate setting times can be set easily and more in complicated ways to be used and displayed comparing to the case where the set times are set directly in the electronic timepiece 40 whose operation methods and display methods of the operation contents are limited.

Further, the electronic timepiece 40 includes the operation receiving unit 47 which receives the command operation to start the measurement.

Therefore, the measurement can be started at a desired timing in hands in the timer function and in the stopwatch function.

Furthermore, the operation receiving unit 47 receives the command operation to end the measurement, and the processor 400 sets a measured time that matches a predetermined condition, which is the shortest measured time in the embodiment, as the set time among measured times from the measuring start timing to a measuring end timing measured which were measured during the execution period of the stopwatch function.

In such way, in the case where the same target is to be measured for a plurality of times, comparison with the best record or the like can be performed in an easy and appropriate manner.

Moreover, a predetermined period is the execution period during which the stopwatch function is executed, and the measured time is the lap time which is obtained in the execution period of the stopwatch function. In such way, for example, in the time measuring where moving along a cyclic course is performed for a plurality of times such as in track and field, swimming, skiing, skating, bicycling, riding on a motorcycle and driving a sports car and in the time measuring where the same operation is performed in a reciprocal manner, the set time which is the comparison target can be easily updated with the best record to carry out the comparison display.

Further, the predetermined condition means the shortest measured time among the measured times. The ratio display with respect to the aimed value in the case where the aim is to shorten the time can be easily carried out in the display region. Furthermore, a user can be aware of the size of the ratio with respect to the aimed value in a prompt and accurate manner, and an effective display can be carried out in an efficient manner in such electronic timepiece 40.

Moreover, the processor 400 sets the timing of the schedule notification operation such as the time point to carry out the alarm notification operation according to the timetable data 432 which is set in advance as the time point of the measuring end timing of the elapsed time, makes the indication display unit display the remaining time of the elapsed time with respect to the set time which is set according to the time difference between a predetermined measuring start timing and a measuring end timing, sets the measuring end timing as the next measuring start timing and newly sets the next measuring end timing according to the timetable data 432 when the measuring end timing is reached.

In such way, by setting a plurality of scheduled time points and by appropriately displaying the time intervals between the scheduled time points and the ratio of the remaining time and the remaining time itself till the next scheduled time point according to the elapsed time from the previous scheduled time point, a user can easily be aware of the time allocation and the like of the operation up to the next scheduled time point to carry out the operation.

Further, the timetable data 432 includes information regarding a time point to carry out the alarm notification operation. That is, a user can appropriately be aware of and manage start time, restart time and the remaining time till the closing time, for example, and he/she can take a rest or proceed with the operation in an efficient manner.

Furthermore, the indication display unit includes the hands 11 to 19 which can rotate and which carry out the display according to their indicating directions. In such way, in the case where the hands 11 to 19 are used to carry out the display according to the rotating operation of the hands 11 to 19, by making a hand (here, the function hand 14) display the remaining ratio and the remaining time till the aimed time according to the indicating direction thereof, a user can easily and promptly compare the set time and the elapsed time (measured time) through senses.

Moreover, the processor 400 sets the reference time according to the set time among a plurality of candidate times which are set in advance. That is, since the remaining time which is to be countdown is set according to the set time which is the comparison target, the display of the remaining time is not too short or not too long comparing to the measured time, and the remaining time can be displayed in an effective length to a user.

Further, the electronic timepiece 40 of the embodiment includes the counting circuit 46 which counts the date and time in addition to the configurations that form the above described time display device. Furthermore, the indication display unit at least displays the time point on the basis of the date and time which is counted by the counting circuit 46.

In such way, by appropriately switching between displaying the ratio of the remaining time of the measured time with respect to the set time and displaying the remaining time itself in the electronic timepiece 40, a more effective time management can be carried out in various places such as on a track field, at a work field and the like and in various situations in an easy and appropriate manner.

Furthermore, with respect to the time display control method which is executed in the electronic timepiece 40 of the embodiment, the method includes the ratio display step to make the indication display unit (the hands 11 to 19 and the dial 3) display the ratio of the remaining time with respect to the set time in the case where the remaining time with respect to the set time of the elapsed time from the measuring start timing is greater than a predetermined reference time, and the method includes the remaining time display step to make the indication display unit display the remaining time in the case where the remaining time is equal to or less than the predetermined reference time. In such way, in the time display control method of the embodiment, an effective display according to the remaining time can be automatically shown to a user and a user can appropriately be aware of the information regarding the remaining time through senses.

Moreover, the program 422 which is installed in the electronic timepiece 40 of the embodiment makes the computer (CPU 41, ROM 42 and RAM 43) of the electronic timepiece 40 function as the ratio display unit for making the indication display unit (hands 11 to 19 and dial 3) display the ratio of the remaining time with respect to the set time in the case where the remaining time with respect to the set time of the elapsed time from the measuring start timing is greater than a predetermined reference time, and makes the computer (CPU 41, ROM 42 and RAM 43) of the electronic timepiece 40 function as the remaining time display unit for making the indication display unit display the remaining time in the case where the remaining time is equal to or less than the predetermined reference time.

In such way, by installing the program which can make a user easily be aware of the remaining time through senses and carrying out the display by the software control, the hand operation can be carried out in an easy and appropriate manner. Further, measuring (time counting) and display can be carried out by flexibly switching the display according to the changes in set time, additional settings and the like.

Here, the present invention is not limited to the above described embodiment in any way and various changes can be carried out.

For example, in the above described embodiment, the ratio display region 4*c* and the remaining time display region 4*d* are disposed next to each other. However, the two regions may be disposed far from each other or a different display region may be disposed between the two regions. Further, as for the ratio display region 4*c*, only the case where the elapsed time is less than the set time is shown. However, with respect to the display regarding the stopwatch function and the like, an elapsed ratio display region which shows how much the elapsed time has overrun the set time in the form of ratio (for example, 100% to 150% or the like) may be further included. Furthermore, in contrast, the configuration and the operation control may be such that the display of the elapsed time will not be carried out.

Moreover, the elapsed time may be displayed in the case of the display regarding the timer function and in the case of the display of sunrise and sunset times, not only in the case of the display regarding the stopwatch function. In the case where a plurality of schedules are displayed, the setting may be such that an elapsed time is to be displayed only when the elapsed time is maximum 30 minutes after reaching the set time point and is within 10% of the time interval till the next new set time point, for example.

Further, in the above described embodiment, an example where the fastest (shortest) lap time is set as the set time in the stopwatch function is described. However, the longest lap time may be set as the set time or the average of a plurality of measured lap times may be set as the set time.

Furthermore, in the above described embodiment, the shortest time among a plurality of lap times is set as the set time. However, the set time may be the shortest time among a plurality of measured times (each time being measured from the start to the stop) during the period when the stopwatch function does not end. Alternatively, even in the case where the stopwatch function has ended, the set time which is set can be made effective or can be updated until the reset operation is carried out or within a day.

Moreover, in the above described embodiment, an example where the lap time is displayed in the stopwatch function is described. However, aimed split times may be set for a plurality of intermediate points and the remaining time of a split time till the aimed split time may be displayed.

Further, in the above described embodiment, display of the remaining time is automatically selected from 10 second, 10 minutes and the like. However, a user can arbitrary set the way in which the remaining time is to be displayed or display of the remaining time can be set so as to be in a uniform manner.

Furthermore, in the above described embodiment, examples of the case where the measuring start timing and the measuring end timing of the elapsed time are set by an operation carried out by a user and the case where the setting is obtained from outside via the communicating unit 49 are described. However, the configuration may be such that only one of these examples is carried out.

Moreover, in the above described embodiment, the remaining ratio and the remaining time are shown by the positions pointed by a hand. However, a hand-like display can be carried out in a digital display screen such as a crystal liquid display. Further, the display may be in such way that the content to be exposed is shown through an opening by rotating a rotation panel or may be in such way that an indicator is displayed in a digital display screen and the remaining ratio or the remaining time is displayed according to the size or length of the display range. That is, the indication operation in the present invention does not refer to the expressing of the value of the measured time directly in a number or a letter, and it refers to the ways of expressing the value of the measured time in the form of a position or a direction that is indicated in a scale or a sign that is pointed, in the form of the size (length) of the display range according to the numerical value to be indicated, in general.

Further, in the above described embodiment, the period in which the elapsed time is to be counted is set with a plurality of scheduled dates and times which are set automatically to be the measuring start timings and the measuring end timings. However, the measuring start timing and the measuring end timing may be set as a pair for one schedule. Further, in the case where the sunrise time and sunset time are individually set, only the period between the sunrise time and the sunset time may be the target for counting of the elapsed time, and counting and displaying of the elapsed time may be interrupted during the period between the sunset time and the sunrise time.

Furthermore, in the above described embodiment, an example of a wrist watch type electronic timepiece is described. However, the present invention is not limited to this example in any way. The embodiment of the electronic timepiece may be other various portable types, and may be formed in a shape where the display can be visually confirmed in a good manner when it is placed on a floor, a desk or the like.

Moreover, in the above described embodiment, an example of an electronic timepiece is described. However, the present invention may also be applied in the cases where the similar time counting is to be carried out in various types of electronic devices such as a device for measuring activity whose main function is not the time counting function.

Further, in the above described embodiment, the ROM 42 which can include various types of nonvolatile memories such as a flash memory and the like is exemplified and described as the computer readable medium of the program 422 of the process operation according to the time display control which is carried out by the CPU 41 of the present invention. However, the present invention is not limited to such example in any way. As for other computer readable media, an HDD (hard disk drive), a portable-type storage medium such as a CD-ROM, a DVD disk or the like can be used. Furthermore, as fora medium for providing data related to a program according to the present invention via a communication line, a carrier wave can be used in the present invention.

Moreover, the contents of the various types of processes shown in the embodiments can be executed in combinations, as needed, as long as they do not conflict with each other or cancel out the advantages each other.

In addition, the specific details such as the configurations, contents and procedures of the controlling and the like shown in the above described embodiments can be modified as needed within the scope of the present invention.

Although several embodiments of the present invention are described, the scope of the present invention is not limited to the above described embodiments and includes the scope of the present invention that is described in the claims and the equivalents thereof.

The entire disclosure of Japanese Patent Application No. 2017-023754 filed on Feb. 13, 2017 including description, claims, drawings, and abstract are incorporated herein by reference in its entirety.

What is claimed is:

1. A time display device, comprising:

an indication display unit which displays a content according to an indicating operation, and a processor, and wherein the processor is operable to execute operations including:

setting a reference set time;

counting a counting time from a measuring start timing;

judging whether a remaining time based on the reference set time and the counting time is greater than a threshold set time;

in a case where the processor judges that the remaining time is greater than the threshold set time, making the indication display unit display a ratio of the remaining time with respect to the reference set time; and in a case where the processor judges that the remaining time is equal or less than the threshold set time, making the indication display unit display the remaining time without displaying the ratio of the remaining time with respect to the reference set time.

2. The time display device according to claim 1, wherein the indication display unit includes:

a first display region in which the ratio of the remaining time with respect to the reference set time is indicated; and a second display region in which the remaining time is indicated.

3. The time display device according to claim 2, wherein the indication display unit includes an overrun display region in which displaying regarding the elapsed time is carried out in a case where the elapsed time overruns the reference set time.

4. The time display device according to claim 2, further comprising a communicating unit which receives information regarding the reference set time from outside.

5. The time display device according to claim 2, further comprising an operation receiving unit which receives a command operation to start measuring.

6. The time display device according to claim 1, wherein the indication display unit includes an overrun display region in which displaying regarding the elapsed time is carried out in a case where the elapsed time overruns the reference set time.

7. The time display device according to claim 6, further comprising a communicating unit which receives information regarding the reference set time from outside.

8. The time display device according to claim 6, further comprising an operation receiving unit which receives a command operation to start measuring.

9. The time display device according to claim 1, further comprising a communicating unit which receives information regarding the reference set time from outside.

10. The time display device according to claim 1, further comprising an operation receiving unit which receives a command operation to start measuring.

11. The time display device according to claim 10, wherein the operation receiving unit receives a command operation to end measuring, and the processor sets a measured time which matches a predetermined condition as the reference set time among a measured time from the measuring start timing to a measuring end timing measured during a predetermined period.

12. The time display device according to claim 11, wherein the predetermined period is an execution period of a stopwatch function, and the measured time which is measured during the predetermined period is a lap time obtained during the execution period of the stopwatch function.

13. The time display device according to claim 11, wherein the predetermined condition means a shortest measured time among the measured time which is measured during the predetermined period.

14. The time display device according to claim 1, wherein the processor sets a time point of a measuring end timing of the elapsed time according to predetermined schedule data which is set in advance, the processor makes the indication display unit carry out displaying regarding the remaining time of the elapsed time with respect to the reference set time which is set according to a time difference between a predetermined measuring start timing and the measuring end timing, and when the measuring end timing is reached, the processor sets the measuring end timing as a next measuring start timing and newly sets a next measuring end timing according to the predetermined schedule data.

15. The time display device according to claim 14, wherein the predetermined schedule data includes information regarding a time point at which an alarm notification operation is carried out.

16. The time display device according to claim 1, wherein the indication display unit includes a rotating indication unit which rotates and carries out displaying according to an indicating direction.

17. The time display device according to claim 1, wherein the processor sets the reference remaining time according to the reference set time among a plurality of candidate times which are set in advance.

18. An electronic timepiece, comprising:

the time display device according to claim 1; and a counting unit which counts a date and time, wherein the indication display unit displays at least a time point based on the date and time which is counted by the counting unit.

19. The time display device according to claim 1, further comprising:

a functional hand, and wherein the indication display unit which displays the content according to an indicating operation by the functional hand, and in a case where the predetermined value is greater than the threshold value, the processor makes the indication display unit display a ratio of the remaining time with respect to the reference set time by driving the functional hand.

20. The time display device according to claim 1, further comprising:

a functional hand, and wherein the indication display unit which displays the content according to an indicating operation by the functional hand, and in a case where the predetermined value is equal to or less than the threshold value, the processor makes the indication display unit display the remaining time by driving the functional hand.

21. The time display device according to claim 1 wherein the processor judges whether the reference set time is greater than a threshold set time;

in a case where the processor judges the reference set time is greater than the threshold set time, making the indication display unit display a ratio of the remaining time with respect to the reference set time, and in a case where the processor judges the reference set time is equal or less than the threshold set time, making the indication display unit display the remaining time without displaying the ratio of the remaining time with respect to the reference set time.

22. A time display control method of a time display device including an indication display unit which displays a content according to an indicating operation, the method comprising:

a setting step of setting a reference set time;

a counting step of counting a counting time from a measuring start time;

a judging step of judging whether a remaining time based on the reference set time and the counting time is greater than a threshold set time;

a ratio display step of making the indication display unit display a ratio of the remaining time with respect to the reference set time in a case where the remaining time is greater than the threshold set time; and a remaining time display step of making the indication display unit display the remaining time without displaying the ratio of the remaining time with respect to the reference set time in a case where the processor judges that the remaining time is equal to or less than the threshold set time.

23. A storage medium storing a program which is readable by a computer including an indication display unit which displays a content according to an indicating operation, the program causing the computer to function as:

a setting unit setting a reference set time;

a counting unit counting a counting time from a measuring start time;

a judging unit judging whether a remaining time based on the reference set time and the counting time is greater than a threshold set time;

a ratio display unit which makes the indication display unit display a ratio of the remaining time with respect to the reference set time in a case where the remaining time is greater than the threshold set time; and a remaining time display unit making the indication display unit display the remaining time without displaying the ratio of the remaining time with respect to the reference set time in a case where the processor judges that the remaining time is equal to or less than the threshold set time.

* * * * *